United States Patent [15] 3,683,328
Fayling [45] Aug. 8, 1972

[54] DETECTION OF OBSTRUCTING VEHICLES ON HIGH-SPEED ROADWAYS

[72] Inventor: Richard E. Fayling, White Bear Lake, Minn.

[73] Assignee: Minnesota Mining and Manufacturing Company, St. Paul

[22] Filed: Oct. 10, 1969

[21] Appl. No.: 883,699

[52] U.S. Cl. ..................................340/32, 340/33
[51] Int. Cl. ..............................................G08g 1/09
[58] Field of Search ............180/98, 105, 105 E, 106; 179/1 VE; 340/32, 33, 34, 50, 52, 62, 71; 246/187 C, 187 B, 182 B, 182 C, 191

[56] References Cited

UNITED STATES PATENTS

| | | | |
|---|---|---|---|
| 3,368,639 | 2/1968 | Deane | 180/98 |
| 3,371,278 | 2/1968 | Gelushia et al. | 340/32 |
| 3,229,249 | 1/1966 | Brenner | 340/32 |
| 3,085,646 | 4/1963 | Paufve | 180/98 |
| 3,493,923 | 2/1970 | Stevens et al. | 340/32 |

Primary Examiner—Kathleen H. Claffy
Assistant Examiner—Randall P. Myers
Attorney—Kinney, Alexander, Sell, Steldt, & Delahunt

[57] ABSTRACT

Means and methods for limiting accidents between oncoming and obstructing vehicles on a roadway. Two electric signals are compared within vehicles traveling on the roadway, one signal representative of a standard speed for the vehicles and the other signal representative of the actual speed of the vehicles. When the signals differ by a predetermined amount, an output signal is transmitted to on-coming vehicles, where it is fed to accident-limiting mechanism within the vehicles.

11 Claims, 3 Drawing Figures

PATENTED AUG 8 1972 3,683,328
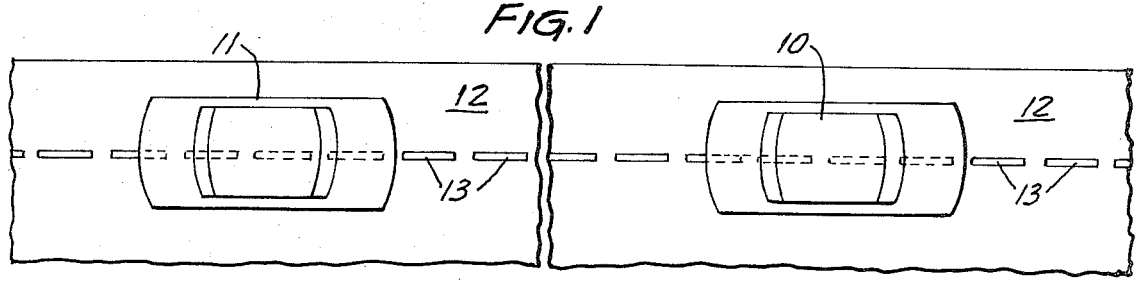
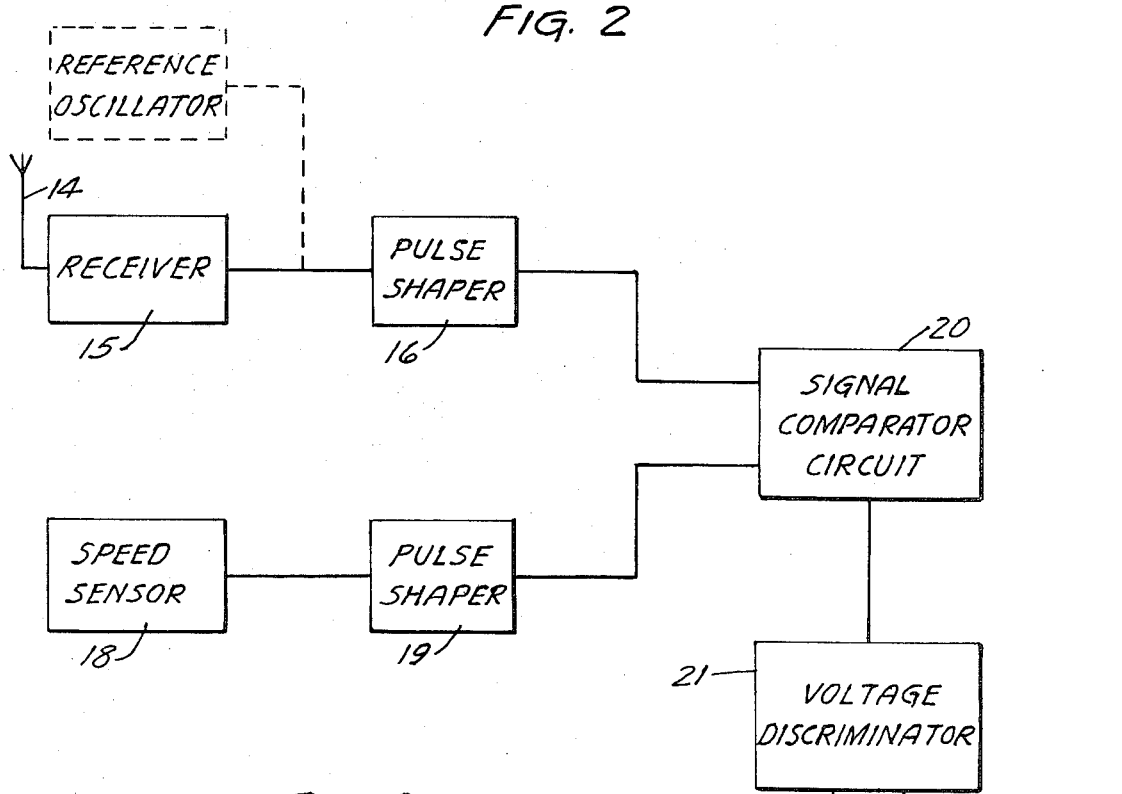
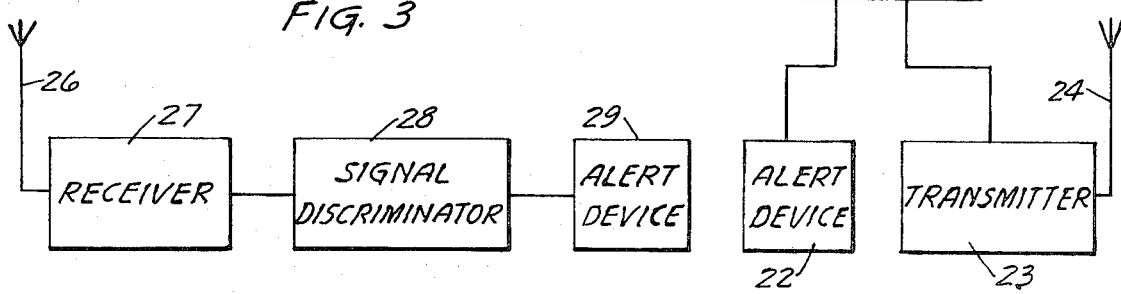
INVENTOR.
RICHARD E. FAYLING
BY Kinney, Alexander,
Sell, Steldt & De La Hunt
ATTORNEYS

DETECTION OF OBSTRUCTING VEHICLES ON HIGH-SPEED ROADWAYS

BACKGROUND OF THE INVENTION

It is well-known that many serious accidents occur on high-speed highways and freeways because on-coming drivers fail to discover slow-moving or stopped vehicles on these roadways before it is too late to avoid a collision. Several attempts have been made to reduce this problem by automatically alerting on-coming drivers to the presence of the obstructing vehicles. Some such suggestions have been based on scanning a roadway with radar or beams of light or sound, but none of these systems has been acceptable. For example, in order for a signal to be received in the sensing vehicle in these systems in adequate time to avoid collisions, there must be a rather long unobstructed straight-line path between the obstructing and on-coming vehicles, and such a straight-line path is most often not existent, because other vehicles are between the obstructing vehicle and the sensing vehicle, because the roadway curves or passes over a hill, etc. Further, such systems lack precision in distinguishing obstructing vehicles from non-obstructions.

A different kind of prior suggestion has involved electrical systems, such as described in U.S. Pat. Nos. 2,847,080, 3,068,448, and 3,159,826, in which the roadway being protected is divided into blocks by pluralities of electric conductor loops embedded in the roadway. Electric currents flowing in the conductor loops are modified by vehicles traveling on the roadway and these current-modifications are used to actuate devices warning on-coming drivers that a slow-moving vehicle is present ahead. The warning devices may take the form of signs or lights on the side of the road, or they may take the form of devices within the on-coming vehicles actuated by radiations from a conductor in the roadway.

A major disadvantage with these suggested electrical systems is their overwhelming complexity and cost. A vast array of electrical conductors must be embedded in the roadway, since the suggested systems require loops of about car length all along the highway. Further, additional circuit components are required for each loop or small group of loops. The whole system requires an expensive supply of electric power, and the system is not fail-safe, because the electric power may be interrupted. These disadvantages make it extremely unlikely that the suggested electrical systems will ever be commercially practical.

SUMMARY OF THE INVENTION

The present invention provides a workable, reliable, and comparatively inexpensive method for limiting accidents between on-coming vehicles on a roadway and obstructing vehicles, such as slow-moving or stopped vehicles, in their path. In general, accidents are limited according to this invention by
1. generating in vehicles traveling on the roadway an electric signal that is representative of the actual speed of the vehicles;
2. providing in the vehicles a standard electric signal that is representative of a standard speed for the vehicles;
3. feeding the vehicle-generated and standard signals to comparing means in the vehicles for comparing the signals and producing an output signal when the signals differ by a predetermined amount;
4. transmitting the output signal produced in the comparing means to on-coming vehicles on the roadway; and
5. receiving the transmitted signal in the on-coming vehicles and feeding it to accident-limiting mechanism within the vehicles.

In some embodiments of this invention, the vehicle-generated signal is generated in magnetic-flux-sensor means within the vehicle by causing relative movement between the magnetic-flux-sensor means and a magnetic-field-producing means. The relative movement is at a rate that corresponds to the rate of rotation of the road-engaging wheels of the vehicle. For example, in one embodiment a magnet is mounted on the speedometer cable of the vehicle, and a magnetic-flux-sensor is mounted adjacent to the path of travel of the magnet.

Also, in some embodiments of the invention, the standard signal is generated in a reference oscillator within the vehicle. The reference oscillator may be actuated, for example by operation by the driver of a switch within the vehicle whenever the vehicle enters a high-speed roadway.

In more preferred embodiments of the invention, the standard signal is transmitted to vehicles traveling on a roadway, and the frequency of the signal transmitted is selected at a control center according to weather or traffic conditions in the area controlled by the transmitted signal. Also in these more preferred embodiments of the invention, vehicles are traveling on a roadway on which a sequence of magnets is installed in a path parallel to the direction of travel on the roadway. The vehicle-generated signal is developed on these roadways in magnetic-flux-sensors mounted on the vehicles in position to sense the fields provided by the sequence of magnets.

In all of these systems, whenever a vehicle is traveling a predetermined amount slower than is standard for the roadway, a signal will be received in the vehicles trailing the slow-moving vehicle to activate accident-limiting mechanism within the trailing vehicles. In some embodiments the accident-limiting mechanism is an alert device, such as a flashing light, buzzer or the like, and in other embodiments the accident-limiting mechanism is mechanism within the vehicles that automatically slows or stops the vehicle, such as shown in U.S. Pat. No. 3,132,710.

DESCRIPTION OF THE DRAWINGS

FIG. 1 is a top view of portions of an illustrative roadway of the invention and two vehicles traveling on the roadway; and FIGS. 2 and 3 are schematic diagrams of illustrative apparatus and circuitry used to practice the invention.

DETAILED DESCRIPTION

FIG. 1 shows a lead vehicle 10 and a trailing or on-coming vehicle 11 traveling on a preferred roadway 12 of this invention, which has a sequence of spaced magnet segments 13 installed in the roadway at a fixed spacing. Most likely, vehicles traveling on such a roadway will be controlled as to either or both speed and direction through use of the sequence of magnets, in the manner described in my copending application, Ser. No. 819,836. In brief summary, speed control on such a roadway involves comparison as to frequency of a standard signal with a signal developed in magnetic-flux-sensor means mounted on the vehicles in position to sense the fields of the sequence of magnets; the speed of the vehicles is adjusted by operation, for example, of the vehicles' carburetor to bring the frequency of the standard and vehicle-generated signals into balance. When vehicles are traveling on a roadway of FIG. 1 under automatic speed control, this invention will warn on-coming drivers when a lead vehicle is malfunctioning so that it cannot maintain the standard speed, or when a lead vehicle is stopped or leaves the roadway because of an accident, or when a driver of a lead vehicle deliberately slows the vehicle from the standard speed. As indicated in my copending application, the magnet segments 13 of a roadway shown in FIG. 1 are preferably polymer-based magnets, which comprise a tough organic polymeric matrix and particles of magnetic material uniformly distributed through the matrix.

FIGS. 2 and 3 schematically show part of illustrative apparatus and circuitry included according to this invention in vehicles traveling on the roadway 12 shown in FIG. 1. As illustrated, a standard signal having a standard frequency representative of the speed that vehicles should be traveling on the roadway 12 is provided in the vehicles by receiving it in an antenna 14 mounted on the vehicles. The signal is broadcast from a transmitter station such as transmitters alongside the roadway, and the signal has a frequency that is generally selected at some control center based on weather and traffic conditions in the area controlled by the signal. From the antenna 14, the signal travels to a receiver 15 and then to a pulse-shaper 16, which produces a periodic signal consisting of pulses of equal height and duration and at the standard frequency.

While the standard or reference signal is being received in the receiver 15, a signal is being generated in the magnetic-flux-sensor means mounted on the vehicle, shown in FIG. 2 as speed-sensor 18, by travel of the flux-sensors through the magnetic fields produced by the magnet segments 13. The frequency of this vehicle-generated signal is representative of the speed that the vehicle is actually traveling. The generated signal is also introduced to a pulse-shaper 19, which produces pulses that are at the generated frequency and are equal in height and duration to those produced in the pulse-shaper 16 but are of opposite polarity.

The outputs from the two pulse-shapers are compared or averaged to produce a direct-current average signal in a signal comparator circuit 20, such as an R-C circuit loop containing a capacitor and resistance in parallel. It is not necessary for the two signals to be in phase to obtain a comparison of the signals in such a signal comparator circuit. If the frequencies of the standard and vehicle-generated signals are equal, there will be a zero average signal from the signal comparator circuit. The greater the deviation between the frequencies of the standard and vehicle-generated signals, the larger will be the voltage of the average signal from the signal comparator circuit. The polarity of the average signal will be determined by whether the standard or the vehicle-generated signal has the greater frequency.

The comparing means of this illustrative circuit also includes a voltage discriminator 21. One normal function for signals from the signal comparator circuit in a vehicle traveling under automatic speed control on a roadway of FIG. 1 is to operate a servo mechanism in the vehicle to adjust the speed of the vehicle to the standard speed. However, the signals are also fed to the voltage discriminator 21, and when the vehicle is for some reason traveling slower than the standard speed, the voltage discriminator will pass output signals that actuate an alert device 22 within the slow-moving vehicle and will pass signals suitable for transmission to a transmitter 23 from which the signal is transmitted through an antenna 24. The voltage discriminator will only pass a signal to the alert device or transmitter if the frequency of the standard and vehicle-generated signals differ by a predetermined amount, meaning that the actual speed of the vehicle differs from the standard speed by a predetermined amount that is regarded as a safety hazard. The voltage discriminator may be programmed so that an activating signal is passed to the alert device when there is a lesser deviation between the standard and vehicle-generated signals than the deviation required before a signal is passed to the transmitter.

When the actual speed of the vehicle is less than the standard speed by a predetermined amount, a signal is transmitted through the transmitter 23 to vehicles trailing the slow-moving vehicle. As shown in FIG. 3, those signals are received through an antenna 26 on the trailing vehicle and passed to a receiver 27. From the receiver 27, the signal is conducted to a signal discriminator 28 which recognizes danger signals and then passes them in this illustrative circuit to an alert device 29. While FIGS. 2 and 3 show separate circuits, these circuits will in many instances be combined in vehicles of the invention. In addition to being received in on-coming vehicles, the transmitted signal may be received in alert devices on the side of the roadway to activate those devices.

As examples of typical ways to program a voltage discriminator 21 of FIG. 2 with respect to a roadway on which the standard speed is 70 miles per hour, a warning to the driver only of a slow-moving vehicle might be given if the speed of the vehicle dropped to 50 miles per hour, while a warning signal might be transmitted to trailing vehicles if the speed of the vehicle dropped to 40 miles per hour or lower. In a preferred embodiment, the signal conducted to the transmitter from the voltage discriminator and then transmitted by the transmitter is coded to indicate in the alert device in the on-coming vehicle the specific mile-per-hour speed of the slow-moving vehicle. If the lead vehicle has actually stopped, the signal transmitted in such a preferred embodiment is also coded to indicate that fact to the driver of the oncoming vehicle. In some embodiments of the invention, when the signal received in the on-coming vehicle indicates the speed of the slow-moving vehicle ahead, the speed of the slow-moving vehicle is compared in the on-coming vehicle with the actual speed of the on-coming vehicle, and an alert is given the driver of the on-coming vehicle only if the two speeds are different by a predetermined amount.

As previously indicated, the principal concern of the present invention is for a signal to be transmitted to trailing vehicles whenever the actual speed of a lead vehicle is less than the standard speed by a certain predetermined amount. However, the invention is also useful to activate an alert device or transmit a signal whenever the actual speed of a vehicle exceeds the standard speed by a predetermined amount. In this latter situation, the transmitted signal may be coded by the voltage discriminator so that it is received by highway patrol authorities, for example, or by vehicles ahead of the vehicle traveling at the excessive speed.

As indicated earlier, instead of the standard signal being received in a vehicle from a transmitter, it may be developed in the vehicle by a reference oscillator. Such a reference oscillator is shown in broken lines in FIG. 2. Also, as previously indicated, the vehicle-generated signal may be generated either by movement of magnetic-flux-sensor means in the vehicle relative to a magnetic-field-producing means, with the relative movement being at a rate corresponding to the rate of rotation of the road-engaging wheels of the vehicle. Such a speed-sensor may be used instead of the speed-sensor described for FIG. 2 above.

Comparison of the frequencies of standard and vehicle-generated signals provides the most accurate way for measuring the amount by which a vehicle is deviating from a standard speed. However, other means may be used for such a determination. For example, the magnitude of a direct-current signal may be controlled through use of the speedometer on a vehicle, with pivoting of the needles of the speedometer adjusting a resistance value that determines the magnitude of the direct-current signal. Such a direct-current signal is then compared on a potentiometer against a standard signal, and any output signal is used to either alert the driver of the slow-moving vehicle or to activate accident-limiting mechanism in on-coming vehicles as described above. Similarly, instead of comparing the frequencies of two alternating-current signals, the magnitude of such signals can be compared, since the magnitude of the signals varies depending on the speed with which magnetic flux lines are cut by a magnetic-flux-sensor.

If it is desired that signals broadcast from a slow-moving vehicle traveling in one direction on a roadway not be broadcast to vehicles traveling in the opposite direction on the roadway, the receivers in vehicles traveling on roadways of the invention will be tuned to different frequencies depending upon their direction of travel. Such a tuning may be accomplished by manual operation by a driver when he enters a roadway, or the tuning may be accomplished automatically by transmission from a control center at the entrance of the roadway.

When a vehicle leaves a roadway of the invention, the circuitry shown in FIGS. 2 and 3 is preferably deactivated, for example, by manual operation by the driver of a switch in the vehicle or automatically by transmission from a control center at the exits of the roadway.

I claim:

1. A method for limiting accidents between on-coming vehicles on a roadway and slower-moving or stopped vehicles in their path comprising
    1. generating in vehicles traveling on the roadway an electric signal that is representative of the actual speed of the vehicles;
    2. providing in vehicles traveling on the roadway a standard electric signal that is representative of a standard speed for the vehicles;
    3. feeding the vehicle-generated and standard signals to comparing means in the vehicles for comparing the signals and producing an output signal when the vehicle-generated and standard signals indicate that the actual speed of the vehicles is slower than the standard speed by more than a predetermined amount;
    4. transmitting the output signal produced in the comparing means to on-coming vehicles on the readway; and
    5. receiving the transmitted signal in the on-coming vehicles and feeding it to accident-limiting mechanism within the vehicles.

2. A method of claim 1 in which an output signal is produced and transmitted only when the vehicles are traveling slower than the standard speed.

3. A method for limiting accidents between on-coming vehicles on a roadway and slower-moving or stopped vehicles in their path comprising
    1. generating in vehicles traveling on the roadway an electric signal having a frequency representative of the actual speed of the vehicles;
    2. providing in vehicles traveling on the roadway a standard signal having a frequency representative of a standard speed for the vehicles;
    3. feeding the vehicle-generated and standard signals to comparing means in the vehicles for comparing the signals and producing an output signal when the frequencies of the vehicle-generated and standard signals indicate that the actual speed of the vehicles is slower than the standard speed by more than a predetermined amount;
    4. transmitting the output signal produced in the comparing means to on-coming vehicles on the roadway; and
    5. receiving the transmitted signal in the on-coming vehicles and feeding it to accident-limiting mechanism within the vehicles.

4. A method of claim 3 in which the standard signal is transmitted to vehicles traveling on the roadway from a transmitter station.

5. A method of claim 3 in which the standard signal is developed by apparatus within vehicles traveling on the roadway.

6. A method of claim 3 which includes installing a sequence of magnets along the roadway in a path parallel to the direction of travel on the roadway, and generating the vehicle-generated signal in said vehicles by mounting magnetic-flux-sensor means on the vehicles in position to pass through the magnetic fields produced by the sequence of magnets.

7. A method of claim 6 comprising installing polymer-based magnets as at least part of said installation of magnets.

8. A method of claim 3 in which the vehicle-generated signal is generated in magnetic-flux-sensor means within the vehicles by causing relative movement between the magnetic-flux-sensor means and a magnetic-field-producing means adjacent to the magnetic-flux-sensor means, the relative movement being at a rate corresponding with the rate of rotation of the wheels of the vehicle.

9. A method of claim 3 in which an output signal is produced and transmitted only when the vehicles are traveling slower than the standard speed.

10. Apparatus and circuitry for inclusion in vehicles to limit accidents between on-coming vehicles on a roadway and obstructing vehicles in their path comprising 1. generating means for generating in the vehicles an electric signal that is representative of the actual speed of the vehicles;
2. standard-signal means for providing a standard electric signal that is representative of a standard speed for the vehicles;
3. comparing means for receiving and comparing the vehicle-generated and standard signals to produce an output signal when the vehicle-generated and standard signals indicate that the actual speed of the vehicles is slower than the standard speed by more than a predetermined amount;
4. transmitter means for transmitting the output signal produced in the comparing means to on-coming vehicles on the roadway;
5. receiver means for receiving the transmitted output signal; and
6. accident-limiting mechanism actuated by the received output signal.

11. Apparatus and circuitry of claim 10 in which the comparing and transmission means produce and transmit an output signal only when the vehicles are traveling slower than the standard speed.

* * * * *

UNITED STATES PATENT OFFICE
CERTIFICATE OF CORRECTION

Patent No. 3,683,328　　　　　　　　　Dated　August 8, 1972

Inventor(s)　　Richard E. Fayling

It is certified that error appears in the above-identified patent and that said Letters Patent are hereby corrected as shown below:

The filing date for the patent is December 10, 1969 and not October 10, 1969.

Signed and sealed this 26th day of December 1972.

(SEAL)
Attest:

EDWARD M. FLETCHER, JR.　　　　　　　　ROBERT GOTTSCHALK
Attesting Officer　　　　　　　　　　　Commissioner of Patents